Figure 1:
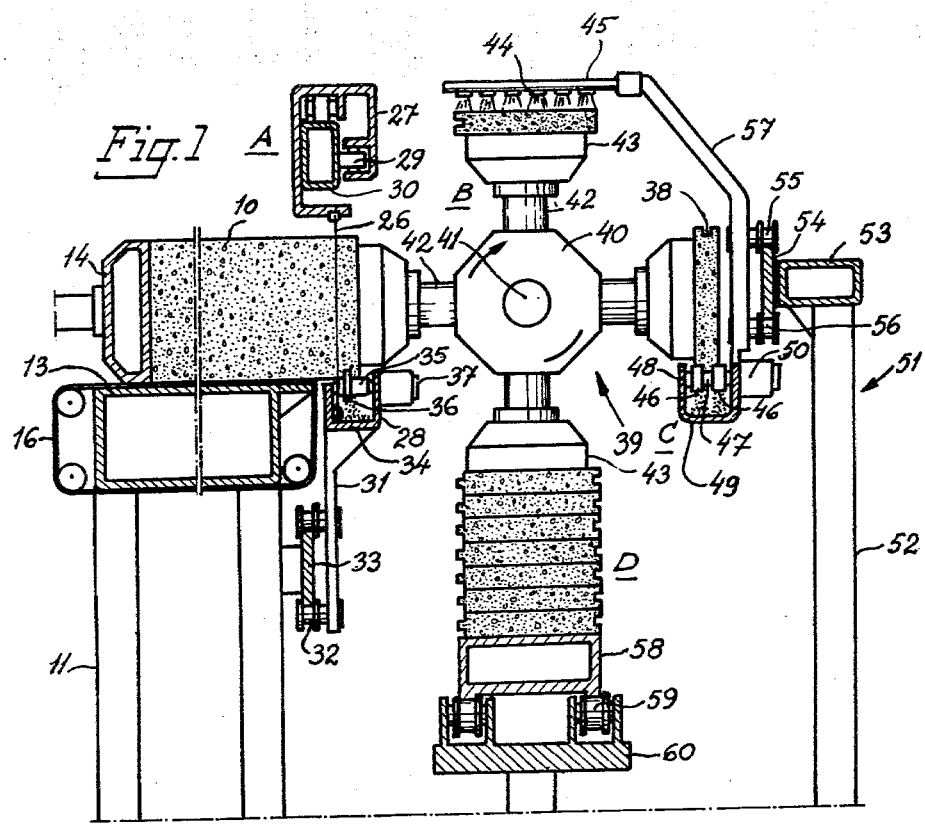

United States Patent [19]

Göransson

[11] 4,202,228
[45] May 13, 1980

[54] METHOD OF CUTTING SLABS FROM A BODY OF UNCURED, LIGHT-WEIGHT CONCRETE AND AN APPARATUS FOR CARRYING OUT THE METHOD

[75] Inventor: Rolf E. Göransson, Åkarp, Sweden
[73] Assignee: Internationella Siporex AB, Malmo, Sweden
[21] Appl. No.: 920,337
[22] Filed: Jun. 29, 1978
[30] Foreign Application Priority Data

Jun. 30, 1977 [SE] Sweden ................. 7707610
Jun. 30, 1977 [SE] Sweden ................. 7707611

[51] Int. Cl.² .................. B26D 7/06; B26D 1/44
[52] U.S. Cl. ................................. 83/23; 29/38 B;
83/152; 83/154; 83/255; 83/651.1; 264/158;
414/72; 414/225; 414/737
[58] Field of Search .............. 83/152, 154, 255, 256,
83/651.1, 23; 214/1 BV, 1 BD, 6 FS, 8.5 E;
261/82, 83; 264/158; 29/38 B, 38 C; 414/223,
225, 737, 72

[56] References Cited

U.S. PATENT DOCUMENTS 3,792,635  2/1974  Goransson .................. 83/651.1
4,083,908  4/1978  Kalveres et al. .................. 83/152

*Primary Examiner*—Robert Louis Spruill
*Assistant Examiner*—W. D. Bray
*Attorney, Agent, or Firm*—Fred Philpitt

[57] ABSTRACT

The present invention is concerned with a method of and apparatus for cutting a slab from a body of uncured light-weight concrete, resting on a support surface. The method comprises the step of moving the body of uncured light-weight concrete along a longitudinal axis of said support surface through a predetermined distance; cutting a slab from said body while supporting the front face of said slab, moving the slab away from said body along an extension of said longitudinal axis; and subsequently moving the slab along at least one arcuate movement path in a plane perpendicular to said support surface and parallel to said longitudinal axis. The apparatus for performing the methods includes a sequentially moveable work feed means, a wire cutter mechanism for cutting a slab from the face of the concrete and a carosel-like pneumatic suction device for holding and transporting the cut slab to subsequent spraying, shaping and stacking stations.

16 Claims, 2 Drawing Figures

U.S. Patent

May 13, 1980

4,202,228

METHOD OF CUTTING SLABS FROM A BODY OF UNCURED, LIGHT-WEIGHT CONCRETE AND AN APPARATUS FOR CARRYING OUT THE METHOD

The present invention relates to a method and apparatus for cutting slabs from a body of uncured, light-weight concrete. By "uncured" is meant a concrete which has not yet fully hardened and which has a consistency similar to that of a firm cheese, such that the body will retain its shape against normal handling pressures but can be cut by passing a cutting wire therethrough.

It is known in the art to cut a body of uncured, light-weight concrete having a longitudinal extension into a number of slabs, using a vertically extending cutting wire. In accordance with one known method, the body of uncured, light-weight concrete is moved into one end of a cutting apparatus resting on a carriage. The cutting apparatus is provided at each end thereof with fork-shaped elements arranged for reciprocating movement towards and away from the centre of the apparatus. Extending beneath the fork-shaped elements are lifting members which are arranged to lift the body of concrete from the surface of the carriage on which it rests. The fork-shaped elements and the lifting members are arranged to co-operate with each other such that as the body of concrete is lifted it is moved in the direction of its longitudinal axis through a distance which is slightly greater than the desired thickness of the slab. The body of concrete is then lowered and a slab is cut therefrom, whereafter the cycle of working movements is repeated etc. The slabs cut from the body of concrete are each time automatically moved in line onto a further carriage which, when full, is moved to an inspection station, where each slab is inspected for defects, and from there to further stations in which the slabs are subjected to working operations, e.g. such operations as providing tongues and grooves on respective side edges of the slabs, applying reinforcing fibres to said slabs, etc.

In accordance with a known method and apparatus for inspecting and/or treating slabs of uncured light-weight concrete, the slabs are stacked on edge on a conveyor belt arranged adjacent a carousel-like pick-up device having a number of angularly displaced spokes, each of which carries at one end thereof a suction cup. The spokes are arranged to rotate about an axis extending perpendicularly to the direction of movement of the belt on which the slabs are stacked. Arranged adjacent the outfeed end of the belt is a pneumatically or hydraulically operated carrier for moving the leading slab of the line of slabs into engagement with a suction cup in register therewith. The spokes are then rotated so that the slab is moved to a station for further treatment or for inspection and so that a further suction cup is brought into registry with the line of slabs on the conveyor.

As will readily be understood, the task of cutting the slabs and moving them in stacks to a separate working station for inspection and further treatment is laborious and time consuming. An object of the invention is therefore to provide a method in which a cast-body of uncured light-weight concrete can be cut into slabs whilst resting horizontally on a conveying surface forming one side of the mould in which the body was cast and to move each slab immediately when cut to at least one working station for inspection and/or further treatment. An object of the present invention is also to provide an apparatus in which the steps of cutting a cast-body of uncured light-weight concrete into slabs and moving each slab to a working station for further treatment can be carried out continuously on one working site, without need of manually moving the slabs from the cutting site to the inspection and/or treatment site, thereby enabling the whole operation to be readily superintended.

Accordingly there is provided a method of cutting a slab from a cast body of uncured light-weight concrete, resting on a support surface, comprising moving the body of uncured light-weight concrete along a longitudinal axis of said support surface through a predetermined distance; cutting a slab from said body whilst supporting the front face of said slab, moving the slab away from said body along an extension of said longitudinal axis; and subsequently moving the slab along at least one arcuate movement path in a plane perpendicular to said support surface and parallel to said longitudinal axis.

The cast-body of uncured light-weight concrete is moved from the casting site to the cutting station whilst still in its mould, whereafter one end wall and the side walls of the mould are removed with the exception of the side against which the cast body rests whilst being cut and the cast body is moved towards the cutting wire in the direction of the longitudinal axis of the body in increments equal to the desired thickness of the slabs. As each slab is cut, it is automatically moved through an arcuate path to a further station for inspection and/or further treatment.

Thus, the method according to the invention enables a cast-body of uncured concrete to be cut into slabs and said slabs to be inspected and further treated at one single working site and in a sequence of correlated working steps.

Conveniently, a multiplicity of treatment stations are arranged at respective positions of rotation relative to said longitudinal axis, a major surface of the slab being provided at one such station with a coating of release agent to enable mutually superimposed slabs to be readily separated one from the other subsequent to being cured in an autoclave. In a further station, the slab may be provided with reinforcing material, such as a layer of fibrous material pressed into the outer surface of one major surface thereof.

When the slabs are to form building elements, such as roofing tiles, a groove is cut into one edge surface of the slab, preferably as it is being cut from the cast-body of uncured concrete, whereafter the slab is moved in an arcuate path and turned through 180° and a tongue formed on the edge surface of the slab opposite that containing the groove.

There is also provided an apparatus for cutting slabs from a cast-body of uncured light-weight concrete and moving said slabs through an arcuate path to at least one treatment station, in which apparatus said cast-body is moved stepwise on a cutting bed into cutting engagement with a vertically extending cutting wire, and in which said at least one arcuate path is located in a plane extending perpendicularly to the horizontal plane of said cutting bed and parallel thereto, wherein a rotatable slab-carrying device having a plurality of extensible and retractable gripping means disposed on said carrying device at predetermined angular positions relative to the axis of rotation thereof is arranged adjacent said cutting wire, said gripping means being arranged to grip the front face of a slab during the cutting of the same from said body and, upon rotation of said carrying device, to move said slab along said arcuate path for further treatment.

Friction reducing means may be arranged between the cast body and the opposing surface of the cutting bed to facilitate movement of the body therealong. The friction reducing means may have the form of a strip of polytetrafluorethylene or glass-fibre fabric or any other suitable material which will allow the infirm cast-concrete body to be moved incrementally along the cutting bed with the minimum of friction.

Alternatively, when the walls of the mould are of a so-called hollow-box construction, the side of the mould-wall forming the cutting bed and facing the cast-body may be perforated and means provided whereby the interior of the cutting bed can be placed in communication with a source of fluid under pressure, preferably air under pressure, so that a cushion of air, or fluid, can be created beneath the body suspending the same during at least its movement along said bed.

Axial movement of the cast-body along the cutting bed is effected by means of a pressure pad and a piston-cylinder-arrangement co-operating therewith. Preferably the pressure pad comprises an end wall of the mould.

When the friction reducing means has the form of a foil strip, the strip is inserted in the mould prior to pouring concrete mass thereinto so as to lie against the side of the mould-wall which is to form the cutting bed, and means are provided for connecting the ends of said strip to the drive belt or chain of a drive system which assists the pressure pad in moving the cast-body stepwise along the cutting bed, said belt passing around suspension wheels in a closed loop.

Thus, the drive belt of the drive system, including the foil strip, is connected to the pressure pad, so that as the pressure pad moves forwards, under the action of the piston-cylinder arrangement, to move the cast body along the cutting bed, the drive belt will be entrained thereby assisting the movement of said body.

Figure 2:
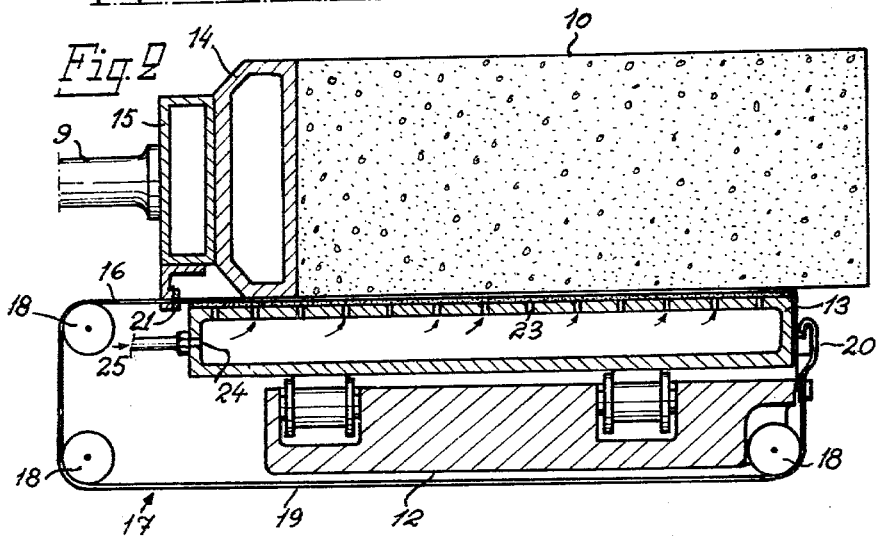

So that the invention will be more readily understood and further features thereof made apparent, the method according to the invention will now be described in more detail with reference to apparatus shown in the accompanying drawing, in which:

FIG. 1 is an end view of said apparatus showing a cutting bed arranged adjacent a carousel-like pick-up device; and FIG. 2 is a side view, in larger scale, of a further embodiment of the cutting bed shown in FIG. 1, with a cast-body of uncured light-weight concrete resting on said path.

As illustrated in the drawing, in the cutting of slabs from a cast-body of uncured concrete and the further treatment of the slabs in accordance with the invention, a mould containing a body 10 of uncured light-weight concrete is moved onto a lifting device 11 of a cutting station on a carriage 12. Subsequent to positioning the mould in the cutting station, the end walls and one long side of the mould are removed, to leave the cast-body 10 resting on a long wall 13 of the mould with a further side 14 of the mould resting against one end of the cast-body 10, as shown in the drawing, said long wall 13 forming the cutting bed of the cutting station. Engaging the mould side 14 is a pressure beam 15 (FIG. 2) which is connected, for example, to a piston-cylinder-device for movement in the longitudinal direction of the cast-body 10, of which piston-cylinder-device only the piston 9 is shown.

In the illustrated embodiment of the invention there is arranged between the mutually opposed faces of the cast-body 10 and the mould-side 13 a sheet of foil material 16, which may comprise Teflon ®, a glass-fibre fabric or a similar friction-reducing material. The foil 16 lies against the side of the mould on which the cast-body is to rest in the cutting station.

As shown in the drawing, the pressure beam 15 is arranged to co-operate with a drive-system generally shown at 17, this drive system comprising three guide wheels 18 around which a drive-wire or chain 19 extends. One end of the drive-wire or chain 19 is provided with a connecting device 20 to which one end of the foil 16 is fastened subsequent to removing the walls of the mould as hereinbefore described. The other end of the foil 16 is firmly connected to the mould side which is in turn acted upon by the pressure beam 15 by a connecting device 21, so that the foil 16 forms a loop with the drive chain 19. In the illustrated embodiment, the cast-body 10 is moved in increments along the mould side 13 by means of the piston 9 via the pressure-beam 15. Since the pressure-beam 15 is connected to the drive-chain 19, which now includes the foil 16, of the drive-system 17, axial movement of the piston 9 in the feed direction of the cast-body 10 will cause the drive-chain 19 and the foil 16 to move in corresponding directions, thereby facilitating sliding of the cast-body 10 on the mould-side or cutting bed 13. Although not shown, one or more of the wheels 18 may be driven in some suitable way, to further assist in moving the cast-body 10 step-wise along the mould-wall 13, the drive to said wheel or wheels being synchronized with the piston-cylinder-device so as to move the body a predetermined distance along the mould-side 13, this distance being equal to the desired thickness of a slab.

As will be seen from the drawing, the mould-sides are of hollow-beam construction. In the alternative embodiment shown in FIG. 2, the side of the mould-wall 13 facing the foil 16 is provided with a series of holes 23, whilst in a web of the mould-wall 13 there is provided a further hole 24 through which the hollow interior of the mould-wall can be placed in communication with a source of fluid under pressure, as indicated at 25, the arrangement being such that when gas or fluid under pressure is charged to the hollow interior of the mould-wall 13, the cast-body 10 will be supported on a gas cushion, thereby enabling the cast-body to be moved along the mould-wall in a substantially friction-less manner. Although the preferred embodiments require the provision of a foil and/or a gas cushion to reduce the friction between the cast-body 10 and the opposing surface of the mould-wall 13 during movement of said body therealong, it will be understood that said friction can be reduced in other ways, such as by spraying the inner surface of the mould-wall with a suitable release agent or lubricant.

As illustrated in the FIG. 2, arranged at one end of the cutting bed or mould-wall 13 is a cutting wire 26 which extends under tension, vertically at right angles to the longitudinal axis of the cutting bed 13 between a first carriage 27 and a second carriage 28 arranged for linear movement in a direction perpendicular to the plane of the drawing. More specifically the carriage 27 is provided with glide members which in the illustrated embodiment have the form of rollers 29 arranged to run along respective surfaces of a fixed guide bar 30 which is stationary relative to the carriage 27, while the carriage 28 is provided with an extension 31 which carries rollers 32 arranged to roll along respective surfaces of a fixed guide rail 33 which is stationary relative to the carriage 28, movement of the carriages 27, 28 along their respective guide rails causing the wire to pass through the cast-body 10 of uncured light-weight concrete to cut a slab of desired thickness therefrom. The manner in which the carriages 27, 28 are guided for movement perpendicularly to plane of the drawing is not restrictive of the scope of the invention, and any suitable arrangement for moving the wire in the desired manner may be provided.

When the slabs severed from the cast-body 10 are to be used as building elements, such as interlocking roofing tiles for example, means may be provided for forming either a groove or a tongue on the downwardly facing edge surface of the slab as the slab is being cut. To this end the carriage 28 of the illustrated embodiment is generally of U-shaped configuration, with the web 34 of the carriage facing downwardly. Extending between the mutually opposing limbs of the carriage is a driven spindle 35 on which a cutting tool 36 is mounted. The end of the spindle 35 remote from the cutting bed 13 is connected to a drive motor 37.

As the cutting wire 26 is drawn through the cast-body 10, the motor 37 is energized to rotate the spindle 35, whereupon the tool 36, which in the illustrated embodiment is a groove cutter, will cut a groove along the adjacent edge surface of the slab, here indicated at 38. Conveniently, although not shown, the motor 37 may be connected to a drive-belt pulley system to which the carriages 27, 28 are also connected such that rotation of the motor 37 will cause the carriages 27, 28 to move along the cutting path of the wire 26 simultaneously as the cutting tool 36 is activated to cut a groove in said edge surface. The cutting wire 26 may be attached to respective carriages 27, 28 so as to be held in tension therebetween in any known manner, but preferably in a manner which allows one wire to be readily exchanged for another when desired.

Operating in conjunction with the cutting station is a carousel-like carrier device generally shown at 39. The carrier device 39 comprises a central hub arrangement 40 which is rotatable by means of a drive motor (now shown) about a horizontal axis 41 extending at right angles to the axis of the cutting bed 13. The hub 40 is provided with a plurality of hollow, extensible and retractable spokes 42 uniformly spaced about the axis 41, the spokes of the illustrated embodiment totalling four in number. Each spoke 42 carries at the end thereof remote from the hub 40, a gripping element in the form of a suction cup 43 having an elastic seal (not shown), and is connected to a source of vacuum (not shown) via a valve means by which respective gripping means 43 can be alternatively connected to said source or disconnected therefrom for reasons hereinafter explained.

The drive arrangement of the hub 40 is arranged so that each time the hub is rotated the spokes 42 with its associated gripping means 43 are rotated through arcuate paths to respective treatment stations.

In the cutting of slabs from a cast-body of uncured light-weight concrete and in the further treatment of the cut slabs in accordance with the method according to the invention, a mould containing a cast body 10 is moved on a carriage 12 onto the elevatable means 11 of the cutting station, whereafter certain of the walls of the mould are removed in the manner aforedescribed. The foil 16 is then connected to the drive chain 19, as shown at 20, whereafter the mould-wall or cutting bed 13 with the cast-body 10 resting thereon is lifted, together with the other mould-wall 14 against which the pressure beam 15 acts, upto the level of the piston-cylinder-arrangement 9, such that as the piston 9 is extended it will push the cast-body 10 in increments along the cutting bed 13, assisted by the foil 16 and possibly also by a cushion of gas provided through the holes 24 in the cutting bed 13. The spokes 42 are then rotated, or may have previously been rotated, so that a gripping means 43 is in register with the front surface of the cast-body 10, whereupon the means 43 is brought into contact with said front surface and the spoke connected to said vacuum source via said valve so that the gripping means 43 firmly supports said front surface. The cutting-wire drive means is then activated to cause a slab 38 to be cut from the cast-body 10, whereupon the spoke 42 in question is retracted along a line coincidental with an extension of the aforementioned axis of the cast-body, through a distance sufficient to enable the slab to the rotated through an arcuate path without hinderance from the remaining portion of the cast-body 10. As previously mentioned, if the slab is intended for use as an interlocking building element, a groove or tongue is formed on the downwardly facing edge surface of the slab as the slab is being cut. This cutting station is designated A in FIG. 1.

Subsequent to retracting the spoke 42 in the cutting station A, the hub 40 is rotated through 90° in a plane perpendicular to the horizontal plane of the bed 13 and parallel with the long axis thereof to a station in which the surface of the slab opposite the aforementioned front surface, i.e. the surface gripped by the gripping means 43, faces upwardly. In station B, the upwardly facing surface of the slab 38 is coated with a suitable release agent to enable slabs, which are stacked for curing in an autoclave as hereinafter described, to be readily separated one from the other. The release agent is supplied through a spray nozzle 44 via a pipe 45 from a source not shown. The supply of release agent to the upper face of the slab is controlled by regulating means (not shown) so as to be synchronized with the rotation of the hub 40.

The hub 40 is then rotated a further 90° to station C, such that the edge of the slab which faced downwardly in station A, i.e. the edge in which a groove was cut, now faces upwardly. In station C, the downwardly facing edge of the slab of the illustrated embodiment is cut to form a tongue thereon, so that the slab now exhibits a tongue and a groove on mutually opposite side edges thereof.

As will readily be understood, by arranging for the cuts to be made on the slab edges with said edges facing downwardly, dust and grit formed during a cutting operation will fall away from the cutting devices, thereby reducing the risk of blockages.

As shown in FIG. 1, the cutting device of station C comprises two wood wheels 46 arranged at a predetermined distance apart on a rotary spindle 47. The spindle 47 is journalled at either end thereof in bushings disposed in the limbs 48 of a generally U-shaped housing 49. One end of the spindle 47 is drivingly connected to a motor 50. As with the motor 37 of the cutting station A, the motor 50 may also be connected to a pulley arrangement, such that rotation of the motor will cause the cutter 47 to traverse the slab 38 to form a tongue thereon.

In the illustrated embodiment, the cutter is guided for movement along said edge of the slab 38 by means of a guide arrangement shown generally at 51, comprising an upright post 52 having an elongate guide bar 53 at the top thereof said guide bar having a length at least equal to the distance traversed by the wire 26 when cutting a slab. Mounted on the end of the guide bar 53 nearest the hub 40 is a guide rail 54 having upper and lower edges for receiving upper and lower guide rollers 55, 56 respectively. The rollers are carried on an angled pipe or arm 57 one end of which is connected to the limb of the housing 49 adjacent the motor 50 and the other end of which is connected to the spray nozzles 44, so that movement of the cutters 46 along the downwardly facing edge of a slab in station C will cause simultaneous movement of the spray nozzles along the upwardly facing surface of a slab in station B.

Subsequent to cutting a tongue in station C, the slab is rotated through 90° to station D, which in the illustrated embodiment is a stacking station in which slabs treated in stations A–C are stacked one upon the other on a support surface 58, for transportation to an autoclave in which curing of the slabs takes place.

The support surface 58 has the form of a hollow beam resting on rollers 59 forming part of a vertically moveable table 60. Initially, the table 60 and support surface 58 are lifted to within close proximity of the hub 40, the distance between said surface and said hub being such as to permit a slab to be rotated from station C to station D and the respective spoke extended to deposit a slab on said support surface. Each time a slab is deposited, the table is lowered by an amount equal to the thickness of a slab, until it reaches a bottom limit position, whereupon the support surface is rolled from the table 60 and transported to the autoclave. As will be evident from FIG. 1 the mutually opposed surfaces of respective slabs of a stack of slabs will have a coating of release agent therebetween thereby facilitating separation of the slabs subsequent to their being cured.

As will also be evident from the aforegoing, all surfaces of a slab can be readily inspected for faults and defects during passage of the slab between the various stations. The surface covered by the gripping means, i.e. the front surface of the cast-body, can be inspected prior to engaging the gripping means in station A, or subsequent to depositing the slab at station D.

The invention is not restricted to the described and illustrated embodiments, but can be modified within the scope of the accompanying claims.

For example, a larger number of stations than that shown may be provided around the circular path travelled by respective gripping means, the number of spokes provided being equal to the number of stations desired. In one conceivable further station, the slabs may be provided with reinforcing material, such as a mat of reinforcing fibres pressed into the still relatively soft concrete. In still a further station, a pigment or paint may be applied to one or more surfaces of respective blanks, or an insulating material or the like may be placed on one surface of a blank, to form a sandwich-like structure with an underlying slab in the stacking station.

It will be understood that all drive means of the apparatus are synchronized, so that the cast-body is moved a predetermined distance along the cutting bed and a slab cut from said body in step with the incremental movement of the carousel between the different treatment stations, and that the valve means for connecting the spokes of the hub to a source of vacuum to pick-up a slab and to hold said slab firmly whilst treating the same and for connecting said spokes to an atmospheric pressure source to release said slabs are actuated in time with the synchronisation of said drive means. Further, means can be provided for removing faulty slabs automatically.

The advantages afforded by the apparatus according to the invention are many. For example, on average it takes only seven minutes to disect a cast-body into slab form, and to inspect, treat and stack the slabs. Because all movements are synchronized and take place between precise limit positions, the slabs are produced with a high degree of precision. The amount of space required by the apparatus is small compared with that required by separately located apparatus for doing the same job. The dust and grit produced during the various treatment operations is readily collected and falls away from the working stations, thereby reducing clogging tendencies. All surfaces can be inspected during the cutting operation.

Other modifications are also possible within the scope of the following claims.

I claim:

1. A method of cutting a slab from a body of uncured, light-weight concrete resting on a longitudinally extending support surface, comprising: moving a body of uncured light-weight concrete along the longitudinal reach of said support surface through a predetermined distance, said body having a front face perpendicular to said longitudinal reach; supporting said front face of said slab; cutting a slab from said body while supporting said front face; moving said slab away from said body along an extension of said longitudinal axis; and subsequently moving the slab along at least one arcuate movement path in a plane perpendicular to said support surface and parallel to said longitudinal axis.

2. A method according to claim 1, wherein the slab is moved to a plurality of treatment stations arranged at respective positions of rotation relative said longitudinal axis.

3. A method according to claim 1 or claim 2, wherein a groove is cut in the bottom edge of the slab whilst separating the slab from said body.

4. A method according to claim 1, or claim 2, wherein the slab is moved through an arcuate path such that the face of the slab opposite said front face is turned upwards, and wherein a release agent is applied to said upwardly turned face.

5. A method as claimed in claim 4, wherein the slab is moved through an arcuate path such that the edge of said slab containing said groove faces upwards, and wherein a tongue is formed on the edge of the slab opposite said upwardly facing edge.

6. A method as claimed in claim 1, wherein the slab is moved through an arcuate path to a treatment station in which reinforcing fibrous material is applied to said slab.

7. A method as claimed in claim 1, wherein the slab is moved through an arcuate path to a working station in which a hydrophobic agent is applied to a major surface of said slab.

8. A method as claimed in claim 1, wherein the slab is moved through an arcuate path to a station in which a layer or sheet of material, such as aluminium foil, is applied to a major surface of said slab.

9. A method as claimed in claim 1, wherein the slab is moved through an arcuate path to a depositing station in which respective slabs are stacked for transport to a curing station.

10. A method as claimed in claim 9, wherein the slabs are stacked so that a treated major surface of one slab lies against the untreated major surface of an underlying slab and such that all grooves and tongues are arranged on their respective sides of the stack.

11. An apparatus for cutting slabs from a cast-body of uncured light-weight concrete and for moving said slabs through an arcuate path which apparatus includes:
   (a) a vertically extending cutting wire including means for moving said wire relative to said concrete for cutting a slab therefrom,
   (b) a cutting bed for moving a cast-body stepwise into cutting engagement with said cutting wire,
   (c) a rotatable slab carrying device arranged adjacent said cutting wire, said slab carrying device including a plurality of extensible and retractable gripping means located at predetermined angular positions relative to its axis of rotation, said gripping means including means for gripping the front face of said slab during the cutting of the same from said cast body and, upon rotation of said slab carrying device, to move said slab through an arcuate path that is located in a plane extending perpendicularly to the horizontal plane of the bottom of said cutting bed.

12. An apparatus according to claim 11 wherein said cutting bed is formed by one wall of the mould in which the body of uncured light-weight concrete was cast.

13. An apparatus according to claim 12 wherein a pressure pad is provided at one end of the cutting bed for moving the cast body along said bed, and wherein said pressure pad comprises a further wall of the mould in which the body was cast.

14. An apparatus according to claim 11 wherein the rotatable slab-carrying device comprises a hub which is rotatable about an axis extending perpendicularly to the longitudinal axis of said cutting bed, a plurality of retractable and extensible, hollow spokes extending in uniform angularly spaced relationship around said hub, suction cups arranged on the ends of respective spokes remote from said hub, and means for applying a suction force to said cups and for interrupting said force at determined positions of rotation of said spokes.

15. An apparatus according to claims 11, 12 or 13 wherein said slab-carrying device is arranged above a vertically movable stacking platform.

16. An apparatus according to claim 14 wherein the number of spokes of said slab-carrying device equals the number of working stations.

* * * * *